Jan. 15, 1957  H. A. SPERLICH  2,777,223
IRONING MECHANISM
Filed April 1, 1955  2 Sheets-Sheet 1
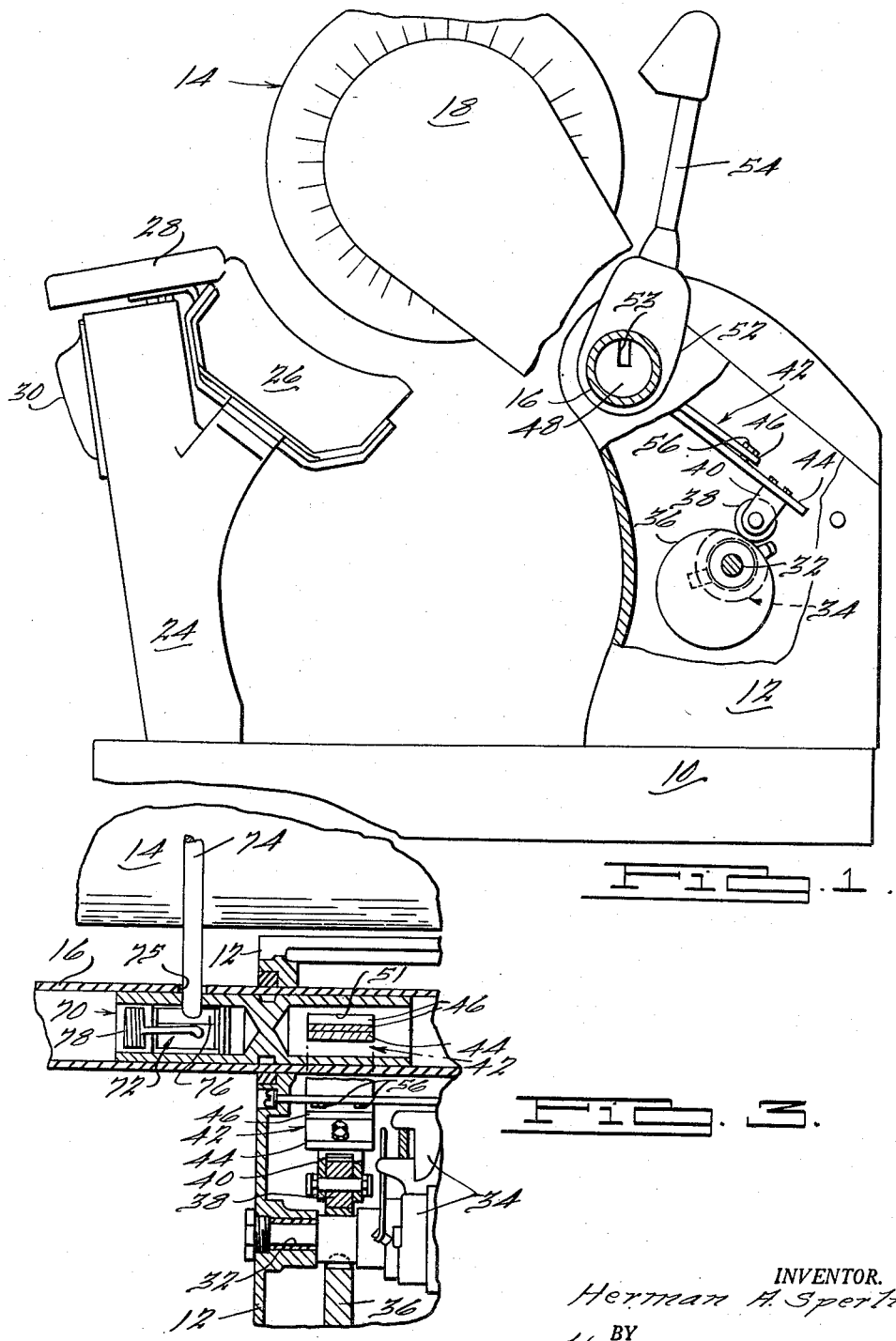
INVENTOR.
Herman A. Sperlich
BY
Harness, Dickey & Pierce
ATTORNEYS Jan. 15, 1957  H. A. SPERLICH  2,777,223
IRONING MECHANISM
Filed April 1, 1955  2 Sheets-Sheet 2
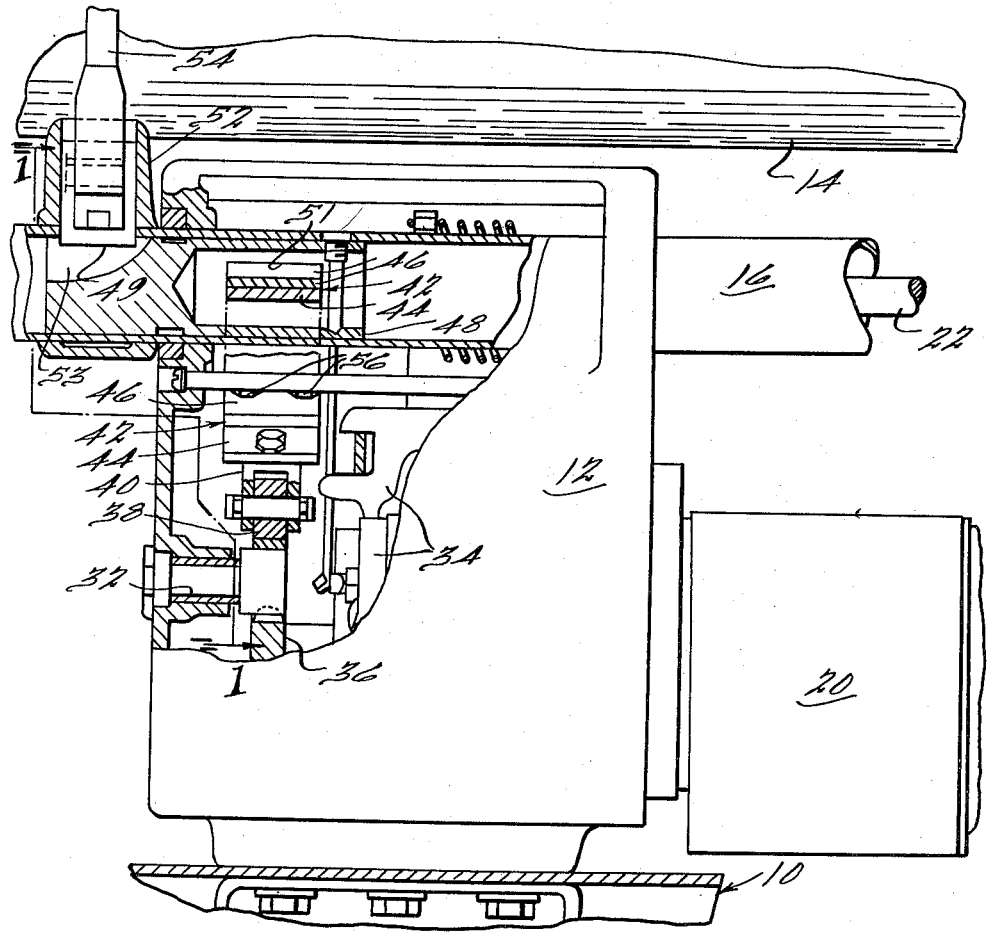
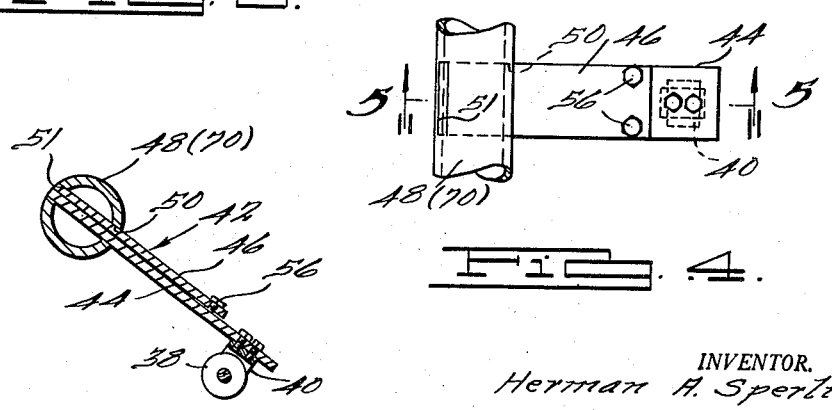
INVENTOR.
Herman A. Sperlich
BY
Harness, Dickey & Pierce.
ATTORNEYS United States Patent Office 2,777,223
Patented Jan. 15, 1957

2,777,223
IRONING MECHANISM

Herman August Sperlich, Highland Park, Mich., assignor to Ironrite, Inc., Mount Clemens, Mich., a corporation of Michigan Application April 1, 1955, Serial No. 498,641

7 Claims. (Cl. 38—58)

The present invention relates generally to roll-type ironing machines and more specifically to an arm of adjustable stiffness for moving a movable ironing element such as a roll relative to a stationary ironing element such as an ironing shoe.

Among the objects of this invention is to provide a resilient connection between a drive mechanism and a means for closing ironing elements, and especially such a connection for bringing together a movable ironing roll and its shoe, the resilient connection embodying a means to adjust or vary its stiffness so as to effect control of ironing pressures exerted between the ironing elements.

Another object is to provide an inexpensive means for correcting for variations in the stiffness of laminar or leaf-type compound springs so as to permit an easy factory adjustment of spring stiffness so that all ironing machines embodying such springs will have similar operating characteristics.

Still other objects and advantages will be apparent, or will become apparent, upon reference to the more detailed description of the invention to follow and to the accompanying drawings, in which:

Fig. 1 is an end view, with portions broken away and in section, showing a roll-type ironing machine embodying the present invention, the view in particular showing the eccentric-type power-operated roll-closing mechanism and a compound spring lever arm operated thereby, the portion in section being taken generally along the line 1—1 of Fig. 2;

Fig. 2 is a fragmentary elevational view from the rear of the machine with portions broken away and in section, showing the manner in which the compound spring lever arm is passed into a horizontal, tube-like roll-supporting yoke member and secured in a slot in an internal release member or casting therein;

Fig. 3 is a fragmentary elevational view in section similar to that of Fig. 2 but showing the compound spring lever arm of this invention secured in a slot in a pressure sleeve type of release member located within the roll support tube or yoke member;

Fig. 4 is a fragmentary plan view of the adjustable compound spring lever arm and the release members of Figs. 2 and 3, with the outer yoke tube removed; and Fig. 5 is an elevation in section through the release member and spring lever arm, the section being taken along the line 5—5 of Fig. 4.

In accordance with the present invention, Figs. 1 and 2 show a roll-type ironer of the type adapted for home use wherein a table-like base 10 is provided with an upstanding roll-support column or housing 12 for supporting a rotatable, pivotally-mounted ironing roll 14. The roll 14 is supported from the column 12 by a yoke including a tube-like, horizontal lower supporting member 16 rotatably journalled in the column 12 and two vertically-inclined end arms 18 affixed to the tube and rotatably supporting the roll 14 in bearings (not shown). As shown in Fig. 2 an electric motor 20 drives the roll 14 through gearing housed in column 12 (but not shown), such gearing driving a shaft 22 which is supported in bearings in tube 16 so as to extend over to connect with a gear train housed in one of the end arms 18 of the yoke.

Opposite the roll, on what is normally considered the front side of the machine, a shoe support column 24 is secured to the base 10, the shoe 26 being mounted on the column 24 in an inclined position so as to be properly aligned with the roll 14 as it is pivoted on a slightly downward arc about tube 16. On top of the column 24 is a feed table or plate 28 and on the side there is provided a handle 30 of a shoe temperature control.

The roll 14 pivots with the tube 16, so as to come to rest in firm contact with the shoe 26, the pivotal movement of the tube being produced by an eccentric mechanism shown in Fig. 1 and comprising a shaft 32 which is driven by motor 20 acting through a clutch and lever mechanism shown fragmentarily in Fig. 2 and indicated generally by the numeral 34. Upon engagement of the clutch mechanism 34 the shaft 32 is rotated to rotate an eccentric cam 36 which is in contact with a follower roller 38. Secured by bolts to the top of the clevis fitting 40 of follower roller 38 is a compound, leaf-type spring arm 42 composed of a pair of laminations or leaves 44, 46, only the bottom leaf 44 being bolted to the clevis 40. As shown in Figs. 1 and 2 the spring arm 42 is extended upwardly to pass through a circumferential slot (not shown) in tube 16 and into a rotatable release member or casting 48 housed in the tube 16. The end of the lever arm 42 is secured in the release member 48 in a tight-fitting, transversely-extending slot 50 in the near side and slot or groove 51 in the far side (Figs. 4 and 5) so that the included ends of the spring laminations can not separate. The end of lever 42 does not project through the release casting but is retained within the slot or groove 51. Thus, as the cam 36 raises follower roller 38 the rearward or lower end of the lever ram 42 affixed to clevis 40 will be raised causing the casting 48 to tend to rotate in tube 16. The casting 48, however, is releasably locked to tube 16 by means of a spring biased plunger or plate 49 housed in a handle casing 52 secured to tube 16. When locked, force applied to the release member 48 is applied to the tube 16 to raise and lower the roll. A release lever 54 is pivotally carried by the handle casing 52 so that when it is pulled forwardly a short distance by the operator the plunger 49 is caused to enter a slot 53 in the casting 48. When the release lever is pushed away a small distance the plunger is withdrawn again. After insertion of the plunger in member 48 a suitable operator control, such as a knee lever, can be actuated to cause the eccentric 36 to bring the roll 14 down on the shoe 26 or raise it off again. After withdrawal of the plunger 49 from slot 53 further backward movement of the release lever 54 causes it to engage the edge of casing 52 to rotate the tube 16 and separate the roll 14 from the shoe 26. Upon return of the handle 54 the roll will first be lowered onto the shoe and the plunger then inserted to place the roll again under the control of the eccentric mechanism. The foregoing described type of ironer and release mechanism are described more fully in my issued Patent No. 2,688,199, issued September 7, 1954.

The present invention comprises a modification of the spring lever arm 42 for the above and similar machines wherein the two laminations 44, 46 are mounted in the general manner described above, that is, with one end of the laminations restrained against separation and with only the lower lamination being secured to the follower. As shown, the upper lamination or leaf 46 is not secured on its lower or rearward end and rests on top of the lower leaf 44 which is affixed to the follower roller 38. The separating means can be seen in Figs. 1 and 2 but appears more clearly in Figs. 4 and 5. As shown in the latter figures, one of the leaves, such as the upper leaf 46, is provided with one or more screws 56 which are threaded therethrough so their ends can come in contact with the top surface of the other or lower leaf 44. As the screws 56 are advanced through the upper leaf 46 the latter is raised or moved away from the lower leaf 44. Because the upper ends of the leaves are held together against separation in the slot 50 and groove 51 in casting 48, the separation of upper leaf 46 causes it to flex relative to the lower leaf. As a result, the spring arm becomes increasingly stiffer as the separation between the upper and lower leaves or laminations is increased.

In Fig. 3, a second type of release mechanism is shown combined with an adjustable, compound spring lever arm of the type described above. This type of release mechanism is a pressure sleeve type such as is more fully described in my copending application, Serial No. 383,271, filed September 30, 1953, now Patent No. 2,729,903, dated January 10, 1956.

The pressure sleeve release mechanism is shown in Fig. 3 incorporated in an ironer which is similar in general features to that of Figs. 1 and 2, except for the substitution in the yoke tube 16 of a pressure sleeve 70 for the plunger-engaged release casting 48. Inside the sleeve 70 is a rotatable spool member 72 in which is secured a release handle 74. A slot 75 in tube 16 permits a releasing movement of the handle 74 relative to the tube 16 before the tube is engaged to lift the roll. The spool member 72 carries a circumferentially-moveable, release-locking trigger (shown simply as a single line identified by the numeral 76 in Fig. 3) which cams a lock pin (not shown) outwardly into engagement with a rounded-edged slot in the inner surface of tube 16. A torsion spring 78 anchored in an end cavity in spool 72 on one end and secured to the trigger 76 on the other, resiliently biases the trigger into contact with the lock pin so that the sleeve 70 and tube 16 are normally locked to rotate as a unit under the control of the eccentric cam 36. When, however, the release lever 74 is pushed away from the operator, the trigger is moved away from the lock pin against the action of the spring 78 to permit the lock pin to move out of the slot, thereby releasing the sleeve 70 from the tube 16. The tube 16 can then be rotated to raise the roll 14 off the shoe 26 by engagement of the release handle 74 with the edge of its slot 75 in tube 16.

With the release mechanism of Fig. 3 described generally above, the compound spring lever arm 42 is mounted on the eccentric cam follower 38, in the manner described above, and extended upwardly to pass through a circumferential slot in tube 16 much as in the mechanism of Figs. 1 and 2. The end of the spring arm 42 is passed into a snug-fitting transversely-aligned slot 50 and groove 51 in the sleeve 70 so that the two leaves or laminations 44, 46 are firmly restrained therein against separation. The end of the lever 42 does not project through the sleeve but is held in the groove 51 in the inside surface of the sleeve opposite the slot 50. As in the case of the release mechanism of Figs. 1 and 2, the spring lever arm 42 is pivoted by the eccentric cam 36 to rotate the tube (when the latter is locked to the release member 70) and move the roll 14 relative to the shoe.

In both embodiments illustrated herein the spring lever arm 42 acts as a pivoting lever arm wherein the spring resiliently forces the roll 14 into contact with the stationary shoe 26. It can be readily appreciated that since the cam 36 is fixed in size for a given machine, the principal factor controlling the pressure exerted between the roll and shoe is the spring lever arm 42. The leaves 44, 46 of the latter are conventionally made of spring steel and, as manufactured under practical manufacturing controls, their stiffness will vary to some extent individually and collectively. When these leaves of variable stiffness are combined, the resultant compound spring occasionally does vary somewhat too widely in stiffness for satisfactory operation of the ironing machine. Too stiff a spring will cause the roll to exert too great a pressure on the shoe, and conversely too flexible or "soft" a spring will result in a deficient ironing pressure. Likewise, too stiff or too flexible a spring is likely to cause variation in the "feel" of the emergency roll release handle, especially in the ironer of Figs. 1 and 2 wherein a stiff spring might make it difficult to withdraw the plunger 49. Up to the present time no simple, satisfactory method has existed for adjusting the stiffness, or for correcting for variations in stiffness, of the spring-type lever arms.

The compound spring lever arm 42 of this invention, however, solves the above manufacturing problems in a simple, inexpensive way. After the lever arm is installed in the ironing machine any variation in spring stiffness is easily detected and the adjustng screws run in or backed off to adjust the stiffness of the compound spring to a desired value. The adjustment may be performed with a simple wrench in a few moments time. This saves the time ordinarily required for more complicated adjustments and the time and expense involved in the removal and discard (and/or reprocessing) of springs which are not of the correct stiffness. If desired, one or more of the spring leaves or laminations can be intentionally made slightly on the soft or flexible side so as to enable the screw adjustment to increase the stiffness of the composite spring to the desired value. The adjustable nature of the spring arm also permits easy adjustment of the machine to suit the needs and taste of the individual user or any special type of work the machine is to handle.

In most cases the separation between the leaves required to eliminate individual variations in the stiffness of the spring arms is small, the separation demonstrated in Figs. 1 and 5 being about the minimum for illustration purposes. With one end of the leaves separated, the spring lever arm illustrated no longer functions as a true leaf-type spring because the leaves are separated and the upper leaf or lamination flexes along a slightly different arc than the lower. For the latter reasons, the spring has been characterized in the specification and claims by the broader term "compound spring" since it is a laminar spring made up of more than one element or lamination.

It is obvious that the spring lever arm of this invention could be provided with more than two laminations and provision could be made for separating more than one lamination from each other and from their other mates. Likewise, various means may be provided for separating the laminations and one or more of the separating or stiffness adjusting means, such as the screws 56, could be located in various positions on the length of the spring. It is equally clear that the spring lever arm incorporating a stiffness adjusting means could be employed on still other types of ironing machines and in conjunction with other types of drive and operating mechanisms for the ironing elements. The means demonstrated herein can be employed in any apparatus wherein it is desired to adjust, or vary, the stiffness of any compound spring lever arm composed of a plurality of individual leaf-type laminations or elements.

What is claimed is:

1. In an ironing machine having a stationary ironing element, a second ironing element moveable relative to said stationary element, and means for moving said second element relative to said stationary element, the combination comprising a level arm engaging on one end thereof with said moving means and on the other end connecting with said second ironing element for moving said second element relative to said staticnary element, said lever arm comprising a compound leaf spring having a plurality of leaves in contact substantially along their length, said spring having attached means for separating one of its leaves from its other leaves.

2. In an ironing machine of the type described, the combination of a stationary ironing element, a second ironing element mounted on a support for movement toward and away from said stationary element, said second ironing element being mounted on an element rotatable with respect to said support, a resilient lever arm connecting on its one end with said rotatable element, and means engaging the other end of said arm to rotate said rotatable element, said arm comprising a compound laminar spring having a plurality of leaves in contact substantially along their length and incorporating a means for moving said other end of one lamination away from the corresponding end of another lamination of said spring.

3. In an ironing machine having a stationary ironing element, a second ironing element moveable relative to said stationary element, and means for moving said second element relative to said stationary element, the combination comprising a rotatable support member for said second ironing element for moving it relative to said stationary element, a lever arm secured at one end in said support element for rotating the latter, said lever arm comprising a compound leaf spring comprising at least two laminations, said laminations being in contact substantially entirely along their length, adjustable means for separating the laminations at the other end of the arm, and said moving means engaging said other end of the lever arm to move said second ironing element relative to said stationary element.

4. The combination of claim 3 wherein said adjusting means comprises at least one screw means threaded through one lamination of the compound spring so as to contact another lamination thereof.

5. In an ironing machine having a stationary ironing element, a second element moveable relative to said stationary ironing element and means for moving said second element relative to said stationary element, the combination comprising a tube-like support element for rotatably supporting said second ironing element for movement relative to said stationary element, a member within said tube-like element, a lever arm secured on its one end in said member in said tube-like support element and comprising a compound leaf spring including at least two laminations, adjustable means for separating the other ends of the laminations, said laminations being in contact substantially entirely along their length and said moving means engaging the said other end of said lever arm to move said second ironing element relative to said stationary ironing element.

6. The combination of claim 5 wherein one end of the laminations of said spring is restrained against separation in said member in said tube-like element and the lamination separating means is operative near the other end of said laminations.

7. In an ironing machine of the type described, the combination comprising a stationary ironing element, a second ironing element pivoted for movement into and out of contact with said stationary ironing element, a tube-like supporting member for pivotal support of said second ironing element, a release element in said tube-like member, means for locking said tube-like support member and said release element for rotation as a unit, an arm secured at its one end in said release element in said tube-like member, said arm comprising a compound leaf spring comprising at least two laminar members in contact substantially along their length and secured against separation only at said one end in said release element, a screw member threaded through one of said laminar spring members into contact with another for moving one of said separable ends away from the other, and means engaging said arm at its said other end to move said second ironing element into and out of contact with said stationary ironing element.

References Cited in the file of this patent

UNITED STATES PATENTS

| | | |
|---|---|---|
| 1,742,746 | Zubaty | Jan. 7, 1930 |
| 1,755,685 | Cowley | Apr. 22, 1930 |
| 1,854,442 | Baird | Apr. 19, 1932 |
| 1,937,572 | Hume | Dec. 5, 1933 |
| 2,067,719 | McCabe | Jan. 12, 1937 |
| 2,098,505 | McCullough et al. | Nov. 9, 1937 |
| 2,526,550 | Freis | Oct. 17, 1950 |
| 2,612,368 | Ransome | Sept. 30, 1952 |
| 2,688,199 | Sperlich | Sept. 7, 1954 |